June 11, 1940.  B. PEYTON  2,204,027
SIGNAL DEVICE FOR VEHICLES
Filed June 21, 1939
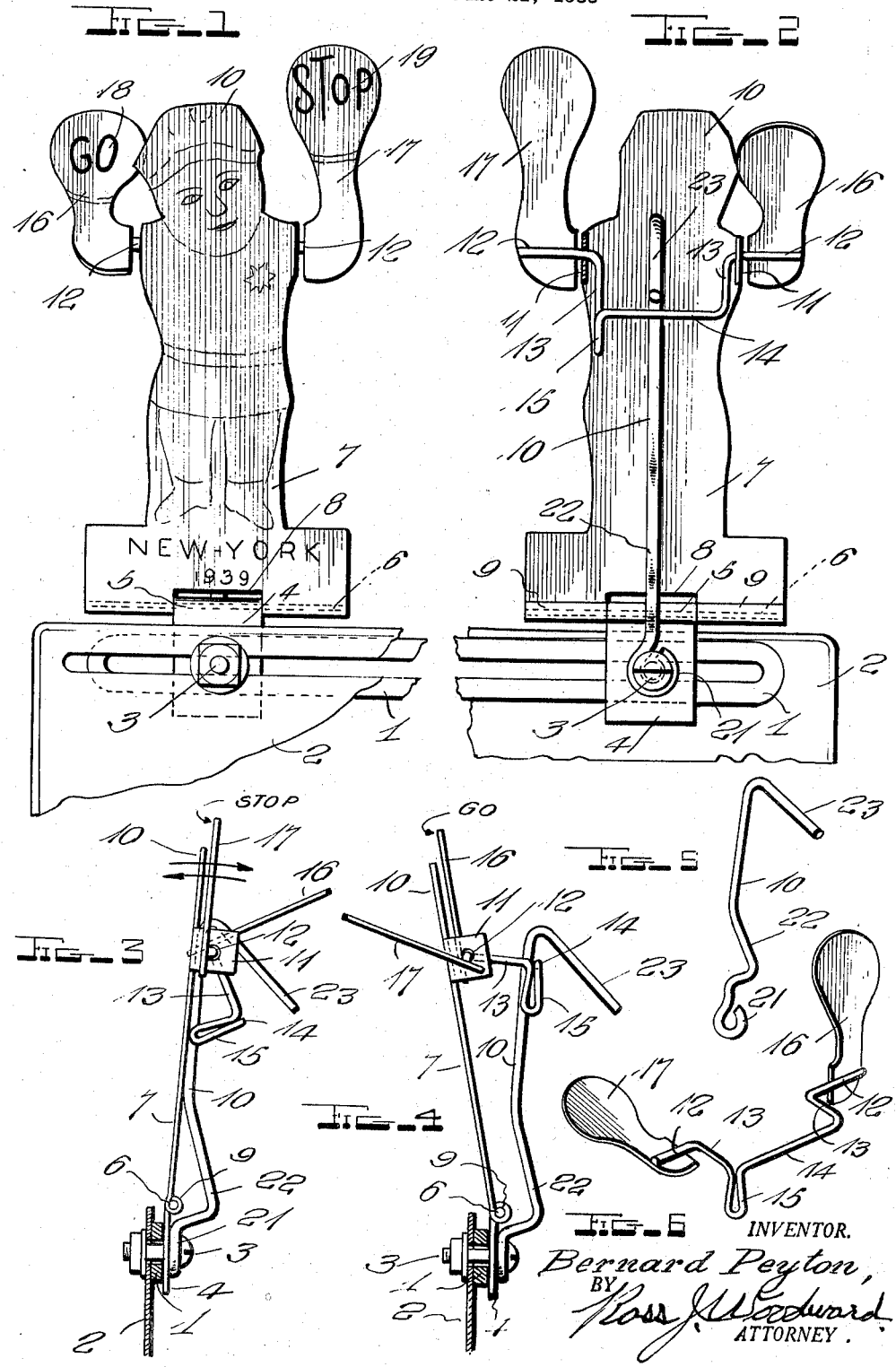
INVENTOR.
Bernard Peyton,
BY Ross J. Woodward
ATTORNEY.

Patented June 11, 1940

2,204,027

UNITED STATES PATENT OFFICE 2,204,027

SIGNAL DEVICE FOR VEHICLES

Bernard Peyton, Queens Village, N. Y.

Application June 21, 1939, Serial No. 280,411

6 Claims. (Cl. 116—51)

This invention relates to a signal device for vehicles and has, as one of its objects, to provide a device of this character adapted to be secured to a bumper, license plate holder, or any other convenient portion of an automobile, where it may be clearly seen and serve as visible means for indicating when the driver of the automobile intends to start or stop the vehicle.

Another object of the invention is to so construct the signal that pivoted arms thereof carrying "go" and "stop" signs will be actuated in response to a forward surge of the automobile or checking thereof.

Another object of the invention is to provide a signal including a body pivoted at its lower end to a support and having arms carried by a crank shaft or yoke extending transversely of the body, tilting movement of the body being limited by an upright member which also constitutes means for actuating the yoke or crank shaft to adjust the arms.

A further object of the invention is to provide a signal which may be easily mounted in a convenient place upon the automobile and actuated entirely by the motion of the car, stopping the car causing a "stop" sign to be displayed and starting of the car causing a "go" sign to be displayed in place of the "stop" sign.

And the invention has as a still further object to provide a sign, the elements of which are stamped from sheet metal, thus permitting the sign to be cheaply manufactured and sold at a low cost.

The invention is illustrated in the accompanying drawing, wherein:

Fig. 1 is a front view of the signal.

Fig. 2 is a rear view thereof.

Fig. 3 is a side elevation of the signal in one position of adjustment.

Fig. 4 is a side elevation showing the signal moved to its other position of adjustment.

Fig. 5 is a perspective view of the upright for controlling movement of the signal.

Fig. 6 is a perspective view of the arms and crank shaft or yoke carrying the same.

This signaling device has been shown applied to the slotted bar or strip 1 to which the license plate 2 of an automobile is detachably secured by bolts 3, but it is to be understood that it may be mounted at any other point found convenient or desirable, where it may be clearly seen by the driver of another automobile or a pedestrian.

The mounting bracket or base 4 is formed of sheet metal and is perforated to receive the bolt 3 by means of which it is secured in position. The upper end of the bracket is rolled to form a bearing 5 through which passes a pin 6 for pivotally connecting the body 7 with the bracket. The body 7 has its lower end slotted to form a recess 8 in which the bearing 5 fits and, at opposite sides of the pocket, is rolled to form bearing sleeves 9 to receive end portions of the pin 6. It will thus be seen that the body will be pivotally mounted and may swing forwardly and rearwardly in response to starting and stopping motion of the automobile.

The body 7 is stamped or otherwise formed from sheet metal and is shaped to represent the outline of a man's body including a head 10. Upon the front or exposed face of this body there has been shown a painted representation of a police officer, but it is to be understood that this is merely one figure which may be depicted upon the body. At the shoulder portions of the body are tongues which are bent rearwardly to form bearings 11 through which are journaled the pivot pins or stub shafts 12 projecting outwardly from the arms 13 of the yoke 14. This yoke is formed from a strand of stiff wire bent to substantially U-shape, as shown in Fig. 6, with its ends forming the pintles 12. The intermediate portion of the wire strand is additionally bent to form an arm 15 extending downwardly from one side of the yoke and adapted to project forwardly and engage the rear face of the body to limit swinging movement of the yoke from the position shown in Fig. 3 to that of Fig. 4. Arms 16 and 17, formed of sheet metal and having their upper or free end portions enlarged and bearing the words "go" and "stop," as shown at 18 and 19, are soldered or otherwise fixedly secured to the pintles and disposed at substantially right angles to each other so that when one arm is in raised position the other will be in lowered position and extend substantially horizontally, as shown in Figs. 3 and 4. Referring to these figures, it will be seen that when the arm 17 is in raised position, the arm 16 projects rearwardly from the body, whereas when the arm 16 is raised, the arm 17 projects forwardly.

Swinging movement of the body 7 must be controlled and in order to accomplish this, there has been provided an upright 20 formed of stiff wire. This upright has an eye 21 at its lower end through which the bolt 3 passes and adjacent the eye, the wire strand forming the upright is bent rearwardly, as shown at 22, so that tilting movement of the body will not be interfered with. The upper end of the strand is bent rearwardly and downwardly to form a bill 23 and attention is called to the fact that the upright is straddled by the yoke 14 while the bill 23 extends downwardly from the upright back of the yoke. Rearward movement of the body is limited by engagement thereof with the upright, as shown in Fig. 3, and forward movement of the upright is limited by engagement of the yoke with the upright, as shown in Fig. 4.

When this signal is in use, it is mounted in an upright position, as shown in Figs. 1 and 2. While it has been shown bolted to the license plate holder, it is to be understood that it may be mounted at any point upon the automobile where it can be clearly seen. When the automobile is started, the forward surge of the car will cause the body of the signal to be swung away from the upright until its movement is stopped by engagement of the bridge of the yoke with the upright and, during this movement, the bridge of the yoke will first engage the upright and then swing upwardly along the same until stopped by engagement with the upper end of the bill. As the bridge of the yoke slides upwardly, the pintles turn in the bearings of the body and the arm 16 bearing the word "go" will move to raised position.

When the automobile is to be stopped or slowed, its forward speed is checked and the body will then swing towards the upright until it comes to rest against the same. During this movement of the body, the bridge of the yoke engages the bill 23 and a cam action takes place which causes the yoke to be swung downwardly and the arm 17 bearing the word "stop" will be moved to raised position.

When the driver of another automobile sees the arm bearing the word "stop" raised, he knows the automobile equipped with the signal is going to stop or at least slow down and will reduce the speed of his own car so that danger of colliding will be avoided. When the driver of the automobile equipped with the signal again starts his car or increases its speed, its forward surge will return the body 7 to the position of Fig. 4 and the arm bearing the word "go" will be raised. It will thus be seen that the signal will be entirely controlled by starting and stopping or slowing of the automobile and the intentions of the driver will be visibly indicated without depending upon manual operation of the signal.

Having thus described the invention, what is claimed is:

1. In a vehicle signal, a mounting, a body pivoted to said mounting, a yoke pivotally carried by said body, arms carried by said yoke and extending from the yoke transversely of each other to dispose one arm upwardly when the other is in a lowered position, and an abutment member carried by said mounting and extending back of the body with a portion passing between the body and the yoke and provided with a bill positioned back of the yoke, said upright limiting pivotal movement of the body and together with its bill constituting means for imparting pivotal movement to the yoke to move one arm to a raised position and the other arm to a lowered position during movement of the body.

2. In a vehicle signal, a mounting, a body pivoted to said mounting, a yoke pivotally carried by said body, arms carried by said yoke and extending from the yoke in angular relation to each other, and means carried by said mounting for limiting pivotal movement of the body and actuating said yoke during movement of the body to swing one arm to raised position and the other arm to lowered position.

3. In a vehicle signal, a mounting, an upright body pivoted at its bottom to said mounting, bearings extending rearwardly from opposite sides of said body, a yoke back of said body having pintles journaled through said bearings and projecting outwardly therefrom, arms fixed to said pintles in angular relation to each other and constituting signaling members and an upright rising from said mounting back of said body and constituting means for limiting pivotal movement of the body and serving as means for actuating the yoke to raise one arm and lower the other arm.

4. In a vehicle signal, a mounting, an upright body pivoted at its bottom to said mounting, bearings extending rearwardly from opposite sides of said body, a yoke back of said body having pintles journaled through said bearings and projecting outwardly therefrom, arms fixed to said pintles in angular relation to each other and constituting signaling members, and an upright rising from said mounting back of said body and having its upper portion passing between the body and the yoke and bent to form a bill extending downwardly at a rearward incline back of the yoke, the upright and its bill constituting means for limiting pivotal movement of the body and also constituting means for actuating the yoke to raise one arm and lower the other arm.

5. In a vehicle signal, a mounting, an upright body pivoted at its bottom to said mounting, bearings extending rearwardly from opposite sides of said body, a yoke back of said body having pintles journaled through said bearings and projecting outwardly therefrom, arms fixed to said pintles in angular relation to each other and constituting signaling members, a finger extending from said yoke for engaging the rear face of said body and limiting pivotal movement of the yoke in one direction, and an upright rising from said mounting back of said body and constituting means for limiting pivotal movement of the body and also constituting means for actuating the yoke to raise one arm and lower the other arm.

6. In a vehicle signal, a mounting, an upright body pivoted at its bottom to said mounting, bearings extending rearwardly from opposite sides of said body, a wire strand bent to form a U-shaped yoke disposed back of the body transversely thereof with its arms projecting towards the body and bent to form pintles projecting outwardly from the arms and journaled through said bearings, a portion of the wire strand being bent to form a finger extending from the bridge of the yoke for engaging the rear face of the body and limiting pivotal movement of the yoke in one direction, signaling members fixed to the pintles and extending therefrom at an angle to each other, and an upright carried by said mounting and extending upwardly back of the body with its upper portion passing between the body and the yoke and bent to form a depending bill disposed back of the bridge of the yoke, the upright and its bill constituting means for limiting pivotal movement of the body and also constituting means for actuating the yoke to raise one arm and lower the other arm.

BERNARD PEYTON.